United States Patent
Abad et al.

(10) Patent No.: US 9,540,766 B2
(45) Date of Patent: *Jan. 10, 2017

(54) COMPOSITE REINFORCER

(75) Inventors: Vincent Abad, Clermont-Ferrand (FR); Sébastien Rigo, Clermont-Ferrand (FR); Emmanuel Custodero, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 779 days.

This patent is subject to a terminal disclaimer.

(21) Appl. No.: 13/825,935

(22) PCT Filed: Sep. 16, 2011

(86) PCT No.: PCT/EP2011/066112
§ 371 (c)(1),
(2), (4) Date: Jul. 2, 2013

(87) PCT Pub. No.: WO2012/038340
PCT Pub. Date: Mar. 29, 2012

(65) Prior Publication Data
US 2013/0273366 A1 Oct. 17, 2013

(30) Foreign Application Priority Data

Sep. 23, 2010 (FR) ..................... 10 57664

(51) Int. Cl.
| | |
|---|---|
| B32B 25/02 | (2006.01) |
| D07B 1/06 | (2006.01) |
| B29B 15/08 | (2006.01) |
| B60C 5/00 | (2006.01) |
| B29D 30/38 | (2006.01) |

(52) U.S. Cl.
CPC .............. *D07B 1/0633* (2013.01); *B29B 15/08* (2013.01); *B60C 5/00* (2013.01); *D07B 1/0666* (2013.01); *B29D 2030/383* (2013.01); *Y10T 428/2938* (2015.01); *Y10T 428/2947* (2015.01); *Y10T 428/2967* (2015.01); *Y10T 428/2969* (2015.01)

(58) Field of Classification Search
CPC ......... C08L 2203/03; C08L 21/00; B60C 9/00
See application file for complete search history.

(56) References Cited

U.S. PATENT DOCUMENTS

| | | | |
|---|---|---|---|
| 4,754,794 A | 7/1988 | Bocquet et al. | |
| 8,763,662 B2 * | 7/2014 | Abad | B29D 30/38 152/451 |
| 8,785,543 B2 * | 7/2014 | Abad | B29D 30/38 524/502 |
| 2003/0150541 A1 * | 8/2003 | Herbelleau | B60C 9/023 152/540 |
| 2005/0004413 A1 * | 1/2005 | Kanauchi | C07C 7/005 585/810 |
| 2006/0174536 A1 * | 8/2006 | Nakanishi | A01K 75/00 43/44.98 |
| 2008/0206449 A1 | 8/2008 | Klei et al. | |
| 2008/0306215 A1 * | 12/2008 | Patil | C08F 8/00 525/132 |
| 2010/0122845 A1 * | 5/2010 | Guo | C08L 23/06 174/72 A |
| 2011/0206552 A1 * | 8/2011 | Shimizu | B21C 1/003 420/99 |
| 2014/0044964 A1 * | 2/2014 | Abad | B29D 30/38 428/378 |
| 2014/0051312 A1 * | 2/2014 | Abad | B29D 30/40 442/149 |
| 2015/0004413 A1 * | 1/2015 | Abad | C08L 21/00 428/378 |
| 2015/0030851 A1 * | 1/2015 | Abad | D07B 1/0666 428/378 |

FOREIGN PATENT DOCUMENTS

| | | |
|---|---|---|
| EP | 0 902 046 | 3/1999 |
| JP | 9 227760 | 9/1997 |
| WO | WO 2011/012521 | 2/2011 |

* cited by examiner

Primary Examiner — Hannah Pak
(74) Attorney, Agent, or Firm — Cozen O'Connor

(57) ABSTRACT

Composite reinforcer (R-2) that is self-adhesive, by curing, to a diene rubber matrix, which can be used as reinforcing element for a pneumatic tire, comprising: one or more reinforcing thread(s) (20), for example a carbon steel cord; a first layer (21) of a thermoplastic polymer, the glass transition temperature of which is positive, for example a polyamide, covering said thread, individually each thread or collectively several threads; a second layer (22) of a composition comprising a poly(p-phenylene ether) ("PPE") and a functionalized diene elastomer bearing functional groups selected from epoxide, carboxyl, acid anhydride and acid ester groups, in particular an epoxidized SBR, covering the first layer (21). Process for manufacturing such a composite reinforcer and rubber article or semi-finished product, especially a pneumatic tire, incorporating such a composite reinforcer.

18 Claims, 3 Drawing Sheets

COMPOSITE REINFORCER

RELATED APPLICATIONS

This is a U.S. national stage of application No. PCT/EP2011/066112 filed on Sep. 16, 2011.

This patent application claims the priority of French application no. 10/57664 filed Sep. 23, 2010, the disclosure content of both of which are hereby incorporated by reference.

FIELD OF THE INVENTION

The field of the present invention is that of reinforcing elements or reinforcers, notably metallic ones, which can be used to reinforce diene rubber articles or semi-finished products such as, for example, pneumatic tires.

The present invention relates more particularly to reinforcers of the hybrid or composite type that consist of at least one core, in particular a metal core, said core being sheathed or covered by one or more layers of polymer.

BACKGROUND OF THE INVENTION

The sheathing of metallic reinforcers with thermoplastic polymers, such as for example a polyamide or polyester, has been known for a very long time, especially so as to protect these reinforcers from various types of external attack such as oxidation or abrasion, or else for the purpose of structurally stiffening, of joining together, various groups of threads or thread assemblies such as cords, and thus increasing particularly their buckling resistance.

Such composite reinforcers, together with their use in rubber articles such as pneumatic tires, have been described in many patent documents.

Patent application EP 0 962 562 has for example described a reinforcer, made of steel or an aramid textile, sheathed by a thermoplastic material such as a polyester or polyamide, for the purpose of improving its abrasion resistance.

Patent application FR 2 601 293 has described the sheathing of a metal cord with a polyamide so as to use it as a bead wire in a pneumatic tire bead, this sheathing advantageously enabling the shape of this bead wire to adapt to the structure and to the operating conditions of the bead of the pneumatic tire that it reinforces.

Patent documents FR 2 576 247 and U.S. Pat. No. 4,754,794 have also described metal cords or threads that can be used as a bead wire in a pneumatic tire bead, these threads or cords being doubly-sheathed or even triply-sheathed by two or even three different thermoplastic materials (e.g. polyamides) having different melting points, with the purpose, on the one hand, of controlling the distance between these threads or cords and, on the other hand, of eliminating the risk of wear by rubbing or of corrosion, in order to use them as a bead wire in a pneumatic tire bead.

These reinforcers thus sheathed with a polyester or polyamide material have, apart from the aforementioned advantages of corrosion resistance, abrasion resistance and structural rigidity, the not insignificant advantage of them being able to be subsequently bonded to diene rubber matrices using simple textile adhesives called RFL (resorcinol-formaldehyde-latex) adhesives comprising at least one diene elastomer, such as natural rubber, which adhesives are known to provide satisfactory adhesion between textile fibres, such as polyester or polyamide fibres, and a diene rubber.

Thus, it may be advantageous to use metal reinforcers not coated with adhesive metal layers, such as with brass, and also surrounding rubber matrices containing no metal salt's, such as cobalt salts, which are necessary as is known for maintaining the adhesive properties over the course of time but which significantly increase, on the one hand, the cost of the rubber matrices themselves and, on the other hand, their oxidation and ageing sensitivity (see for example the patent application WO 2005/113666).

However, the above RFL adhesives are not without drawbacks: in particular they contain as base substance formaldehyde, a substance which it is desirable long-term to eliminate from adhesive compositions because of the recent changes in European regulations regarding this type of product.

SUMMARY OF THE INVENTION

One object of the invention is to provide new adhesive systems or new reinforcers that enable all or some of the aforementioned drawbacks to be alleviated.

One aspect of the invention is directed to a composite reinforcer comprising:
  one or more reinforcing thread(s);
  a first layer of a thermoplastic polymer, the glass transition temperature of which is positive, covering said thread, individually each thread or collectively several threads; and
  a second layer of a composition comprising at least one poly(p-phenylene ether) (abbreviated to "PPE") and a functionalized diene elastomer bearing functional groups selected from epoxide, carboxyl, acid anhydride and acid ester groups, covering the first layer.

Unexpectedly, it has been found that the presence of this second layer makes it possible to ensure that the composite reinforcer of the invention adheres directly (i.e. without RFL adhesive or any other adhesive) and strongly to a diene elastomer matrix or composition such as those widely used in pneumatic tires.

In addition, and equally unexpectedly, the adhesion properties are very appreciably improved with respect to the use of a conventional textile RFL adhesive.

Another aspect of the invention is directed to a process for manufacturing the composite reinforcer above, said process comprising at least the following steps:
  individually the reinforcing thread or each reinforcing thread, or collecting several reinforcing threads, is/are covered by a first layer of the thermoplastic polymer having a positive glass transition temperature;
  a second layer of a composition comprising the poly(p-phenylene ether) and the functionalized diene elastomer bearing functional groups selected from epoxide, carboxyl, acid anhydride and acid ester groups, is deposited on the first layer; and
  the assembly undergoes a thermo-oxidative treatment.

The composite reinforcer according to embodiments of the invention can be used as a reinforcing element for rubber articles or semi-finished products, particularly pneumatic tires, especially those intended to be fitted onto motor vehicles of the passenger type, SUVs ("Sport Utility Vehicles"), two-wheel vehicles (especially bicycles and motorcycles), aircraft, or industrial vehicles selected from vans, "heavy" vehicles, i.e. underground trains, buses, heavy road transport vehicles (lorries, tractors, trailers), off-road vehicles, such as agricultural or civil engineering machines, and other transport or handling vehicles.

Another aspect of the invention relates to any rubber article or semi-finished product, in particular pneumatic tire, that includes a composite reinforcer according to embodiments of the invention.

BRIEF DESCRIPTION OF THE DRAWINGS

The invention and its advantages will be readily understood in the light of the description and the embodiments that follow, in conjunction with the figures relating to these embodiments which show schematically:

in cross section, an example of a composite reinforcer according to the invention (FIG. 1);

Figure 2:
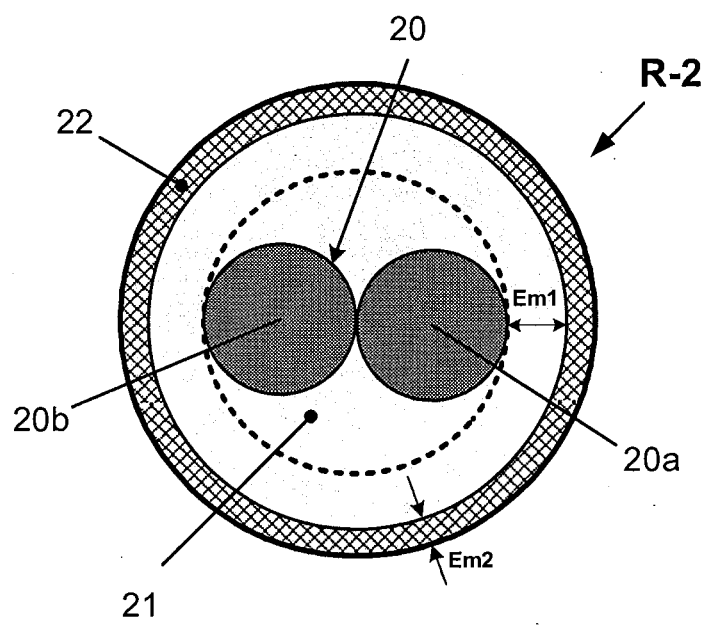
Figure 3:
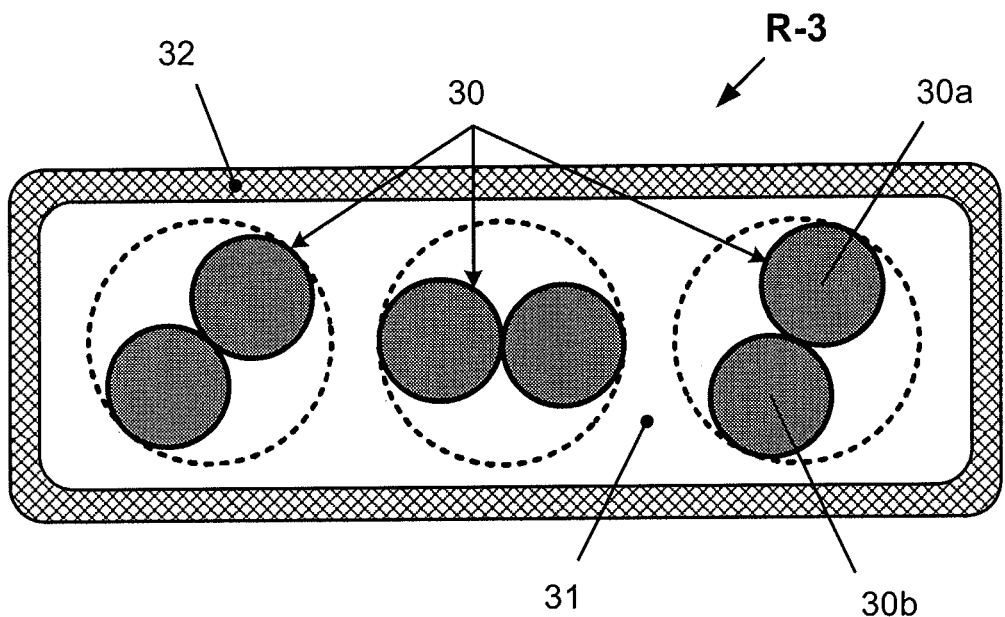
Figure 4:
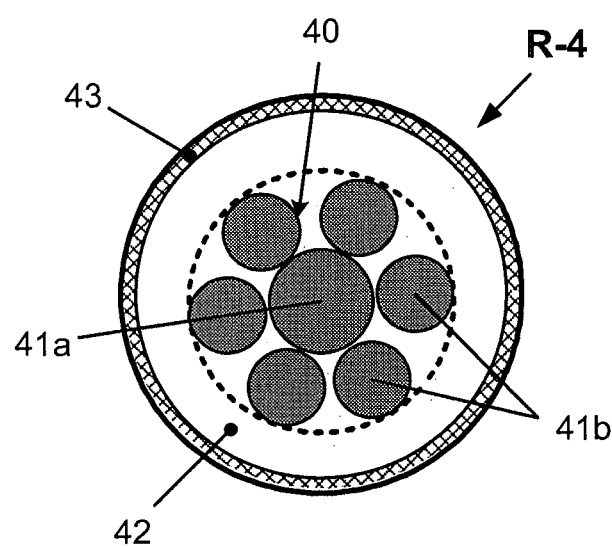
Figure 5:
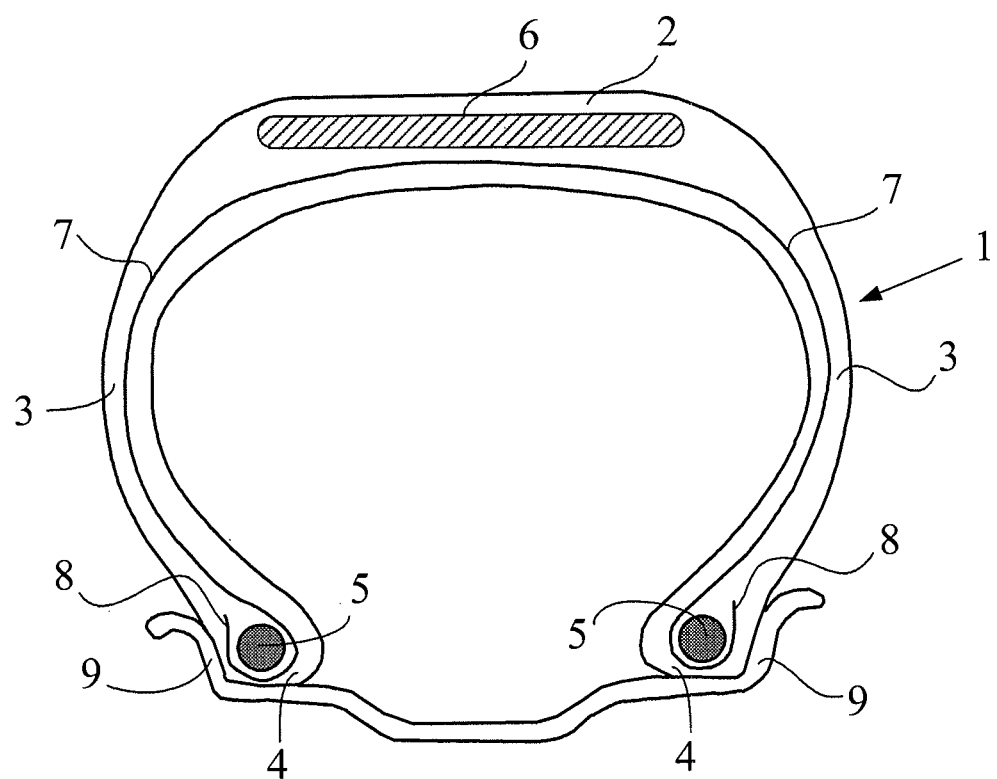

in cross section, another example of a reinforcer according to the invention (FIG. 2);

in cross section, another example of a reinforcer according to the invention (FIG. 3);

in cross section, another example of a reinforcer according to the invention (FIG. 4); and in radial section, a pneumatic tire having a radial carcass reinforcement, in accordance with the invention, incorporating a composite reinforcer according to the invention (FIG. 5).

DETAILED DESCRIPTION OF THE DRAWINGS

In the present description, unless expressly indicated otherwise, all the percentages (%) indicated are % by weight.

Moreover, any range of values denoted by the expression "between a and b" represents the range of values starting from more than a to less than b (i.e. with the limits a and b excluded), whereas any range of values denoted by the expression "from a to b" means the range of values starting from a and going up to b (i.e. including the strict limits a and b).

The composite reinforcer of the invention, capable of adhering directly, by curing, to an unsaturated rubber composition and able to be used in particular for reinforcing diene rubber articles, such as pneumatic tires, therefore has the essential features of comprising:

at least one reinforcing thread (i.e. one or more reinforcing threads);

a first layer of a thermoplastic polymer, the glass transition temperature of which is positive (i.e. greater than 0° C.), covering individually said thread, each thread or collectively several threads; and a second layer of a composition comprising at least on the one hand one poly(p-phenylene ether) (PPE) and on the other hand a functionalized diene elastomer bearing functional groups selected from epoxide, carboxyl, acid anhydride and acid ester groups, covering said first layer.

In other words, the composite reinforcer of the invention comprises a single reinforcing thread or several reinforcing threads, each reinforcing thread being covered (individually or collectively) by two different superposed layers of polymer in contact with each other. The structure of the reinforcer of the invention is described in detail below.

In the present application, the term "reinforcing thread" is understood in general to mean any elongate element of great length relative to its cross section, whatever the shape, for example circular, oblong, rectangular, square, or even flat, of this cross section, it being possible for this thread to be straight or not straight, for example twisted or wavy.

This reinforcing thread may take any known form. For example, it may be an individual monofilament of large diameter (for example and preferably equal to or greater than 50 μm), an individual ribbon, a multifilament fibre (consisting of a plurality of individual filaments of small diameter, typically less than 30 μm), a textile folded thread formed from several fibres twisted together, a textile or metal cord formed from several fibres or monofilaments cabled or twisted together, or else an assembly, a row of threads such as, for example, a band or strip comprising several of these monofilaments, fibres, folded threads or cords grouped together, for example aligned along a main direction, whether straight or not.

The or each reinforcing thread has a diameter preferably smaller than 5 mm, especially in the range from 0.1 to 2 mm.

Preferably, the reinforcing thread is a metal reinforcing thread, especially a carbon steel wire such as those used in steel cords for tires. However, it is of course possible to use other types of steel, for example stainless steel. When a carbon steel is used, its carbon content is preferably between 0.4% and 1.2%, especially between 0.5% and 1.1%. The invention applies in particular to any steel of the steel cord type having a standard or NT ("Normal Tensile") strength, a high or HT ("High Tensile") strength, a very high or SHT ("Super High Tensile") strength or an ultra-high or UHT ("Ultra High Tensile") strength.

More preferably, the metal reinforcing thread is in the form of a cord comprising at least two (i.e. two or more) metal monofilaments joined together, more particularly made of carbon steel.

The steel could be coated with an adhesive layer, such as a layer of brass or zinc. However, a bright, i.e. uncoated, steel may advantageously be used. Furthermore, by virtue of the invention, the rubber composition intended to be reinforced by a metal reinforcer according to the invention no longer requires the use in its formulation of metal salts such as cobalt salts.

The first layer or sheath covering the or each reinforcing thread is formed by a thermoplastic polymer having by definition a positive glass transition temperature (Tg), preferably greater than +20° C. and more preferably greater than +30° C. Moreover, the melting point (denoted by Tm) of this thermoplastic polymer is preferably greater than 100° C., more preferably greater than 150° C. and especially greater than 200° C., depending especially on the nature (in particular textile or metal nature) of the material that forms the reinforcing thread.

This thermoplastic polymer is preferably selected within the group consisting of polyamides, polyesters and polyimides, more particularly within the group consisting of aliphatic polyamides and polyesters. Among polyesters, mention may for example be made of PET (polyethylene terephthalate), PEN (polyethylene naphthalate), PBT (polybutylene terephthalate), PBN (polybutylene naphthalate), PPT (polypropylene terephthalate), and PPN (polypropylene naphthalate). Among aliphatic polyamides, mention may in particular be made of the polyamides 4,6,6,6,6,11 and 12. This thermoplastic polymer is preferably an aliphatic polyamide, more preferably a polyamide 6,6 (or nylon-6,6).

The second layer covering the first layer, and thus in direct contact with the latter, is formed by a polymer composition comprising, in combination with the diene elastomer described in detail later, at least one poly(p-phenylene ether) or poly(1,4-phenylene ether) polymer (abbreviated to PPE).

PPE thermoplastic polymers are well known to those skilled in the art, these being resins that are solid at room temperature (20° C.). Preferably, the PPE used here has a glass transition temperature which is greater than 150° C., more preferably greater than 180° C. The number-average molecular weight ($M_n$) thereof is preferably between 5000 and 100 000 g/mol.

The number-average molecular weight ($M_n$) is determined, in a known manner, by SEC (steric exclusion chromatography). The specimen is firstly dissolved in tetrahydrofuran with a concentration of about 1 g/l and then the solution is filtered on a filter of 0.45 µm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS "STYRAGEL" columns (an HMW7 column, an HMW6E column and two HT6E columns) are used in series. The injected volume of the polymer specimen solution is 100 µl. The detector is a WATERS 2410 differential refractometer and its associated software, for handling the chromatograph data, is the WATERS MILLENIUM system. The calculated average molecular weights are relative to a calibration curve obtained with polystirene standards.

The glass transition temperature of the thermoplastic polymers and diene elastomers described in the present application is measured, in a known manner, by DSC (Differential Scanning calorimetry), for example and except for different indications specified in the present application, according to the ASTM D3418 (1999) Standard.

As non-limiting examples of PPE polymers that can be used in the composite reinforcer of the invention, mention may in particular be made of those selected within the group consisting of: poly(2,6-dimethyl-1,4-phenylene ether), poly(2,6-dimethyl-co-2,3,6-timethyl-1,4-phenylene ether), poly(2,3,6-trimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(1,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2-ethoxy-1,4-phenylene ether), poly(2-chloro-1,4-phenylene ether), poly(2,6-dibromo-1,4-phenylene ether), poly(3-bromo-2,6-dimethyl-1,4-phenylene ether), their respective copolymers and blends of these homopolymers or copolymers.

According to one particular and preferred embodiment, the PPE used is poly(2,6-dimethyl-1,4-phenylene ether) also sometimes known as polyphenylene oxide (or PPO for short). Such commercially available PPE or PPO polymers are for example the PPE called "Xyron S202" from the company Asahi Kasei or the PPE called "Noryl SA120" from the company Sabic.

Preferably, in the composition forming the second layer of the composite reinforcer of the invention, the amount of PPE polymer is adjusted in such a way that the weight content of PPE is between 0.02 and 2 times, more preferably between 0.10 and 1 times, the weight content of functionalized diene elastomer. Below the recommended minima, the adhesion of the composite reinforcer to the rubber may be reduced, whereas above the indicated maxima there is a risk of embrittling the second layer.

The polymer composition of the second layer moreover comprises a functionalized diene elastomer, said elastomer bearing functional groups selected within epoxide, carboxyl, acid anhydride or acid ester groups or functions. Preferably, the functional groups are epoxide groups, that is to say that the diene elastomer is an epoxidized diene elastomer.

It is recalled that the term "elastomer" or "rubber" (the two terms being, in a known manner, synonymous and interchangeable) of the "diene" type should be understood to mean an elastomer resulting at least in part (i.e., a homopolymer or a copolymer) from diene monomers (monomers bearing two carbon-carbon double bonds which may or may not be conjugated).

These diene elastomers, which by definition are not thermoplastic elastomers in the present application, having a Tg that, in the very great majority of cases, is negative (i.e. less than 0° C.), may be classified, in a known manner, into two categories: those said to be "essentially unsaturated" and those said to be "essentially saturated". Butyl rubbers, such as for example diene/α-olefin copolymers of the EPDM type, fall under the category of essentially saturated diene elastomers, having a low or very low content of units of diene origin, always less than 15% (mol %). A contrario, the expression "essentially unsaturated diene elastomer" is understood to mean a diene elastomer resulting at least partly from conjugated diene monomers, having a content of units of diene origin (conjugated dienes) that is greater than 15% (mol %). In the "essentially unsaturated" diene elastomer category, the expression "highly unsaturated diene elastomer" is understood in particular to mean a diene elastomer having a content of units of diene origin (conjugated dienes) that is greater than 50%.

It is preferred to use at least one diene elastomer of the highly unsaturated type, in particular a diene elastomer selected within the group consisting of natural rubber (NR), synthetic poly-isoprenes (IRs), polybutadienes (BRs), butadiene copolymers, isoprene copolymers and mixtures of these elastomers. Such copolymers are more preferably selected from the group consisting of butadiene/stirene (SBR) copolymers, isoprene/butadiene (BIR) copolymers, isoprene/stirene (SIR) copolymers, isoprene/butadiene/stirene (SBIR) copolymers, and mixtures of such copolymers.

The above diene elastomers can, for example, be block, random, sequential or microsequential diene elastomers and can be prepared in dispersion or in solution.

The following are preferably suitable: polybutadienes and in particular those having a content of 1,2-units of between 4% and 80% or those having a content of cis-1,4-units of greater than 80%, polyisoprenes, butadiene/stirene copolymers and in particular those having a stirene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers and especially those having an isoprene content of between 5% and 90% by weight and a glass transition temperature from –40° C. to –80° C., or isoprene/stirene copolymers and especially those having a stirene content of between 5% and 50% by weight and a Tg of between –25° C. and –50° C.

In the case of butadiene/stirene/isoprene copolymers, those having a stirene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/stirene/isoprene copolymer having a Tg of between −20° C. and −70° C., are especially suitable.

More preferably still, an SBR copolymer is used.

A second essential feature of the diene elastomer used in the composite reinforcer of the invention is that it is functionalized, bearing functional groups selected within epoxide, carboxyl, acid anhydride or acid ester groups or functions.

Such functionalized diene elastomers and the processes for obtaining them are well known to a person skilled in the art and are commercially available. Diene elastomers bearing carboxyl groups have been described, for example, in WO 01/92402 or U.S. Pat. No. 6,815,473 and WO 2004/096865 or U.S. Pat. No. 7,312,264; diene elastomers bearing epoxide groups have been described, for example, in US 2003/120007 or EP 0763564 and U.S. Pat. No. 6,903,165 or EP 1403287.

Preferably, the functional groups are epoxide groups, i.e. the diene elastomer is an epoxidized diene elastomer. More preferably still, the epoxidized diene elastomer is selected within the group consisting of epoxidized natural rubbers (NRs), epoxidized synthetic poly-isoprenes (IRs), epoxidized polybutadienes (BRs) preferably having a content of cis-1,4-bonds of greater than 90%, epoxidized butadiene/stirene (SBR) copolymers, and mixtures of these elastomers.

Epoxidized natural rubbers (abbreviated to "ENRs"), for example, may be obtained, as is known, by epoxidation of natural rubber, for example via processes based on chlorohydrin or bromohydrin or processes based on hydrogen peroxides, alkyl hydroperoxides or peracids (such as peracetic acid or performic acid); such ENRs are for example sold under the names "ENR-25" and "ENR-50" (respective degrees of epoxidation of 25% and 50%) by the company Guthrie Polymer. Epoxidized BRs are themselves also well known, sold for example by the company Sartomer under the name "Poly Bd" (for example "Poly Bd 605E"). Epoxidized SBRs may also be prepared by epoxidation techniques well known to a person skilled in the art.

More preferably still, an epoxidized SBR copolymer is used.

The degree (mol %) of functionalization, especially epoxidation, of the functionalized diene elastomers described above may vary to a large extent depending on the particular embodiments of the invention, preferably within a range from 5% to 60%. When the degree of epoxidation is less than 5%, the intended technical effect risks being insufficient whereas above 60%, the molecular weight of the polymer greatly decreases. For all these reasons, the degree of functionalization, especially epoxidation, is more preferably within a range from 10% to 50%.

The epoxidized diene elastomers described above are, in a known manner, solid at ambient temperature (20° C.); the term "solid" is understood to mean any substance that does not have the ability to eventually assume, at the latest after 24 hours, under the sole effect of gravity and at ambient temperature (20° C.), the shape of the container in which it is held.

In contrast in particular to elastomers of the liquid type, these solid elastomers are characterized by a very high viscosity: their Mooney viscosity in the uncured (i.e. uncrosslinked) state, denoted by ML (1+4), measured at 100° C., is preferably greater than 20, more preferably greater than 30, in particular between 30 and 130. An oscillating consistometer as described in the standard ASTM D1646 (1999) is used for this measurement. The measurement is carried out according to the following principle: the sample analysed in the uncured state (i.e. before curing) is moulded (formed) in a cylindrical chamber heated to a given temperature (for example 100° C.). After preheating for 1 minute, the rotor turns within the test specimen at 2 rpm and the working torque for maintaining this movement is measured after rotating for 4 minutes. The Mooney viscosity (ML 1+4) is expressed in "Mooney units" (MU, where 1 MU=0.83 Newton.meter). It will also be recalled that these solid elastomers are characterized, in a known manner, by a high molecular weight, typically substantially greater than their weight between entanglements.

The second layer or polymer composition described above may also contain various additives, preferably in amounts of less than 30%, more preferably less than 20% and even more preferably less than 10% by weight relative to the amount of PPE. Such additives could for example be elastomers or polymers other than those described above, the addition of these elastomers or polymers being intended for example to modulate the stiffness properties of the second layer, so as especially to reduce the stiffness gradients that may exist between the first and second layers. Such additives could also be reinforcing fillers such as carbon black or silica, non-reinforcing or inert fillers, colorants that can be used to colour the composition, plasticizers such as oils, and protection agents such as antioxidants, antiozonants, UV stabilizers or other stabilizers.

Figure 1:
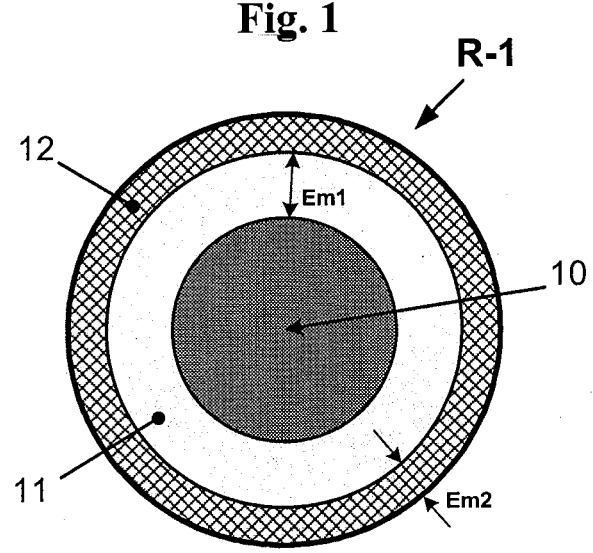

FIG. 1 appended hereto shows very schematically (without being drawn to a specific scale), in cross section, a first example of a composite reinforcer according to the invention. This composite reinforcer denoted by R-1 consists of a reinforcing thread (10) consisting of a unitary filament or monofilament having a relatively large diameter (for example between 0.10 and 0.50 mm), for example made of carbon steel, which is covered with a first layer (11) of a thermoplastic polymer having a positive glass transition temperature, for example made of a polyamide or a polyester, the minimum thickness of which is denoted by $E_{m1}$ in FIG. 1. A second layer (12) of a composition comprising a PPE and a functionalized diene elastomer, for example a BR, SBR or NR of the epoxidized type, covers the first layer (11) and a has a minimum thickness denoted by $E_{m2}$ in FIG. 1.

FIG. 2 shows schematically, in cross section, a second example of a composite reinforcer according to the invention. This composite reinforcer denoted R-2 consists of a reinforcing thread (20) consisting in fact of two unitary filaments or monofilaments (20a, 20b) of relatively large diameter (for example between 0.10 and 0.50 mm) twisted or cabled together, for example made of carbon steel. The reinforcing thread (20) is covered in a first layer (21) of a thermoplastic polymer having a positive glass transition temperature, for example made of polyamide 6,6 or a polyester, with a minimum thickness $E_{m1}$. A second layer (22) of a composition comprising a PPE and a functionalized diene elastomer, for example an epoxidized BR, SBR or NR, with a minimum thickness of $E_{m2}$ covers the first layer (21).

FIG. 3 shows schematically, in cross section, another example of a composite reinforcer according to the invention. This composite reinforcer denoted by R-3 consists of three reinforcing threads (30) each consisting of two monofilaments (30a, 30b) of relatively large diameter (for example between 0.10 and 0.50 mm) twisted or cabled together, for example made or steel or carbon. The assembly formed by for example the three aligned reinforcing threads (30) is covered with a first layer (31) of a thermoplastic polymer having a positive glass transition temperature, for example made of a polyamide or a polyester. A second layer

(32) of a composition comprising a PPE and a functionalized diene elastomer, for example an epoxidized BR, SBR or NR covers the first layer (31).

FIG. 4 shows schematically, again in cross section, another example of a composite reinforcer according to the invention. This composite reinforcer R-4 comprises a reinforcing thread (40) consisting of a steel cord of (1+6) construction, with a central wire or core wire (41a) and six filaments (41b) of the same diameter that are wound together in a helix around the central wire. This reinforcing thread or cord (40) is covered with a first layer (42) of a polyamide 6,6 which is itself covered with a second layer (43) of a composition comprising a PPE and a functionalized diene elastomer, for example an epoxidized BR, SBR or NR.

In the composite reinforcers according to the invention, such as those shown schematically for example in the aforementioned FIGS. 1 to 4, the minimum thickness of the two layers ($E_{m1}$ and $E_{m2}$) may vary very widely depending on the particular production conditions of the invention.

The minimum thickness $E_{m1}$ of the first layer is preferably between 1 μm and 2 mm, more preferably between 10 μm and 1 mm.

According to a particular embodiment of the invention, the minimum thickness $E_{m2}$ of the second layer may be of the same order of magnitude as that of the first layer (in the case of a thick second layer with a thickness for example between 1 μm and 2 mm, in particular between 10 μm and 1 mm), or else may be appreciably different.

According to another particular embodiment of the invention, the second layer could for example be formed by a thin or ultra-thin adhesive layer deposited, for example, by a coating or spraying technique, or another thin or ultra-thin deposition technique, for example with a thickness in the range from 0.02 μm to 10 μm, in particular between 0.05 μm and 0.5 μm.

If several reinforcing threads are used in the composite reinforcer of the invention, the first and second layers may be deposited individually on each of the reinforcing threads (as a reminder, these reinforcing threads may or may not be unitary), as illustrated for example in FIGS. 1, 2 and 4 commented upon above. However, the first and second layers may also be deposited collectively on several reinforcing threads appropriately arranged, for example aligned along a main direction, as illustrated for example in FIG. 3.

The composite reinforcer of the invention can be produced by a specific process comprising at least the following steps:
  during a first step, initially at least one (i.e. one or more) reinforcing thread(s) is firstly covered by the first layer of thermoplastic polymer having a positive glass transition temperature;
  next, during a second step, a second layer of the composition comprising the PPE and the functionalized diene elastomer is deposited on the first layer; and
  finally, the assembly is subjected to a thermo-oxidative treatment.

The first two steps may be carried out, in a manner known to those skilled in the art, continuously in line or otherwise. For example, these steps consist in making the reinforcing thread or each reinforcing thread (taken individually or collectively) pass through dies of suitable diameter in one or more extrusion heads heated to appropriate temperatures, or alternatively, and this constitutes a more preferred embodiment, in a coating bath containing the PPE and the functionalized diene elastomer dissolved beforehand (together or separately) in a suitable organic solvent (or a mixture of solvents).

According to a specific preferred embodiment, the reinforcing thread or each reinforcing thread (taken individually or collectively) is preheated, for example by induction heating or by IR radiation, before passing into the extrusion head supplying the thermoplastic polymer. On exiting the extrusion head, the reinforcing thread or each reinforcing thread thus sheathed is then cooled sufficiently for the polymer layer to solidify, for example using cold air or another gas, or by the thread(s) passing through a water bath followed by a drying step; the or each reinforcing thread thus sheathed and cooled is then covered with the composition of PPE and functionalized diene elastomer, by passing through a coating bath of appropriate dimensions.

The next step consists of a thermo-oxidative treatment intended for improving the bonding between the two layers. The term "thermo-oxidative treatment" is understood by definition to mean a heat treatment in the presence of oxygen, for example the oxygen in the air. Such a step makes it possible to obtain optimum adhesion of the second layer to the thermoplastic polymer first layer—a vacuum heat treatment for example has proved to be ineffective. The temperature used for this heat treatment is preferably between 150° C. and 300° C., for a treatment time more preferably between 20 s and 600 s.

As an example, a reinforcing thread with a diameter of about 0.6 mm, for example a metal cord consisting simply of two individual monofilaments of 0.3 mm diameter twisted together (as for example illustrated in FIG. 2) is covered with a polyamide 6,6 first layer having a maximum thickness equal to about 0.4 mm, in order to obtain a sheathed reinforcing thread having a total diameter of about 1 mm, on an extrusion/sheathing line comprising two dies, a first die (counter-die or upstream die) having a diameter equal to about 0.7 mm and a second die (or downstream die) having a diameter equal to about 0.1 mm, both dies being placed in an extrusion head heated to about 300° C. The polyamide, which melts at a temperature of 290° C. in the extruder, thus covers the reinforcing thread on passing through the sheathing head, at a thread run speed typically several tens of m/min for an extrusion pump rate typically of several tens of cm³/min. On exiting this first sheathing die, the thread may be immersed in a cooling tank filled with cold water, in order for the polyamide to solidify and set in its amorphous state, and then dry, for example by heating the take-up reel in an oven.

For the first sheathing step described above, the cord (reinforcing thread) is advantageously preheated, for example by passing through an HF generator or through a heating tunnel, before passing into the extrusion head.

The thread thus covered with polyamide is then covered with the composition of PPE and functionalized diene elastomer, according to one embodiment adapted to the intended thickness for the second layer.

By way of example, if the intended thickness of the second layer is very substantially smaller than that of the first layer, for example equal to a few tens of nanometers, the thread covered with polyamide passes, for example at a speed of a few m/min or tens of m/min, and over a length of several cm or tens of cm, between two wool baize elements pressed by a mass of 1 kg and continuously imbibed with the PPE and the functionalized diene elastomer (for example epoxidized BR, SBR or NR) diluted in an appropriate solvent (for example with a concentration of 5%, in toluene), so as in this way to cover all of it with an ultra-thin layer of the composition of PPE and functionalized diene elastomer.

After the second operation, for example on leaving the coating bath described above, the composite thread passes through a tunnel oven, for example several meters in length, in order to undergo therein a heat treatment in air. This treatment temperature is for example between 150° C. and 300° C., for treatment times of a few seconds to a few minutes depending on the case, it being understood that the duration of the treatment will be shorter the higher the temperature and that the heat treatment necessarily must not lead to the polymer materials used remelting or even excessively softening.

The composite reinforcer of the invention thus completed is advantageously cooled, for example in air, so as to avoid possible undesirable sticking problems while it is being wound onto the final take-up reel.

A person skilled in the art will know how to adjust the temperature and the duration of the heat treatment according to the particular operating conditions of the invention, especially according to the exact nature of the composite reinforcer manufactured, particularly according to whether the treatment is on monofilaments taken individually, cords consisting of several monofilaments or groups of such monofilaments or cords, such as strips.

In particular, a person skilled in the art will have the advantage of varying, the treatment temperature and treatment time so as to find, by successive approximations, the operating conditions giving the best adhesion results for each particular embodiment of the invention.

The steps of the process according to the invention that have been described above may possibly be supplemented with a final treatment for three-dimensionally crosslinking the reinforcer, more precisely its second layer of PPE and functionalized diene elastomer, in order to further increase the intrinsic cohesion thereof. This crosslinking may be carried out by any known means, for example by physical crosslinking means such as ion or electron bombardment, or by chemical crosslinking means.

Crosslinking may also take place, while the pneumatic tires (or more generally rubber articles) that the composite reinforcer of the invention is intended to reinforce, by means of the intrinsic crosslinking system present in the diene rubber compositions used for making such tires (or articles) and coming into contact with the composite reinforcer of the invention.

The composite reinforcer of the invention can be used directly, that is to say without requiring any additional adhesive system, as reinforcing element for a diene rubber matrix, for example in a pneumatic tire. Advantageously, it may be used to reinforce pneumatic tires for all types of vehicle, in particular for passenger vehicles or industrial vehicles such as heavy vehicles.

As an example, FIG. 5 appended hereto shows very schematically (without being drawn to a specific scale) a radial section through a pneumatic tire according to the invention for a passenger vehicle.

This pneumatic tire 1 comprises a crown 2 reinforced by a crown reinforcement or belt 6, two sidewalls 3 and two beads 4, each of these beads 4 being reinforced with a bead wire 5.

The crown 2 is surmounted by a tread (not shown in this schematic figure). A carcass reinforcement 7 is wound around the two bead wires 5 in each bead 4, the upturn 8 of this reinforcement 7 lying for example towards the outside of the tire 1, which here is shown fitted onto its rim 9. The carcass reinforcement 7 consists, as is known per se of at least one ply reinforced by cords, called "radial" cords, for example textile or metal cords, that is to say that these cords are arranged practically parallel to one another and extend from one bead to the other so as to make an angle of between 80° and 90° with the median circumferential plane (the plane perpendicular to the rotation axis of the tire, which is located at mid-distance from the two beads 4 and passes through the middle of the crown reinforcement 6).

This pneumatic tire 1 of the invention has for example the essential feature that at least one of the crown or carcass reinforcements thereof comprises a composite reinforcer according to the invention. According to another possible embodiment of the invention, it is the bead wires 5 that could be made from a composite reinforcer according to the invention.

EMBODIMENTS OF THE INVENTION

Trial 1

Composite Reinforcer Manufacture

Composite reinforcers, according to or not according to the invention, were firstly manufactured in the following manner. The starting reinforcing thread was a steel cord for pneumatic tires, made of standard steel (having a carbon content of 0.7% by weight), in 1×2 construction consisting of two individual threads or monofilaments 0.30 mm in diameter twisted together with a helix pitch of 10 mm. Cord diameter was 0.6 mm.

This cord was covered with polyamide 6,6 (ZYTEL E40 NC010 from the company DuPont de Nemours; melting point $T_m$ (equal to about 260° C.) was performed on an extrusion-sheathing line by passing it through an extrusion head heated to a temperature of 300° C. and comprising two dies—an upstream die 0.63 mm in diameter and a downstream die 0.92 mm in diameter. The polyamide heated to a temperature of about 290° C. in the extruder (pump rate of 20 $cm^3$/min) thus covered the reinforcing thread (preheated to about 280-290° C. by passing it through an HF generator) running at a speed of 30 m/min. On leaving the sheathing head, the composite reinforcer obtained was continuously run through a cooling tank filled with water at 5° C., in order for the polyamide to solidify in its amorphous state, before being dried using an air nozzle.

This stage of the manufacture resulting in a control composite reinforcer (therefore not in accordance with the invention) consisting of the initial steel cord sheathed only with its polyamide first layer. This control composite reinforcer (denoted by R-5) had a total diameter (i.e. once sheathed) of about 1.0 mm.

Next, during a second step, a second layer of a composition comprising a blend (in a weight ratio 1:0.4) of an epoxidized diene elastomer and of PPE ("Xyron 5202" from the company Asahi Kasei) was deposited, with an intended minimum thickness of a few tens of nanometers, on the cord thus sheathed in the following manner. The cord covered with polyamide 6,6 was passed through a coating bath, at a speed of about 3 m/min, and over a length of about 15 cm, between two wool baize elements pressed by a mass of 1 kg and continuously imbibed with the blend of the epoxidized diene elastomer and PPE, diluted, with a concentration of 5% by weight, in toluene so as in this way to cover all of it with an ultra-thin layer of the composition of PPE and elastomer. The reinforcer thus sheathed is then dried to remove the solvent by evaporation.

The glass transition temperatures of the two thermoplastic polymers used above (polyamide 6,6 and PPE) were equal to about +50° C. and +215° C. respectively (measured for example according to the following procedure: 822-2 DSC instrument from Mettler Toledo; a helium atmosphere;

specimens preheated from room temperature (20° C.) to 100° C. (at 20° C./min) and then rapidly cooled down to −140° C., before finally recording the DSC curve from −140° C. to +300° C. at 20° C./min.

After this second sheathing operation, the assembly (doubly-sheathed composite reinforcer) underwent a thermo-oxidative treatment for a time of about 100 s, by passing it through a tunnel oven at 3 m/min in an ambient atmosphere, heated to a temperature of 270° C. This final stage of the manufacture resulted in a composite reinforcer according to the invention, consisting of the initial steel cord sheathed with its polyamide first layer and with its second layer of PPE and epoxidized diene elastomer. The composite reinforcer according to the invention produced in this way (the reinforcer R-2 as shown schematically in FIG. 2) had a total final diameter of about 1 mm.

To determine the best operating conditions for the thermo-oxidative treatment in this trial, a range of temperatures from 160° C. to 280° C., for four treatment times (50 s, 100 s, 200 s and 400 s), was examined beforehand.

During these manufacturing trials, two different epoxidized diene elastomers were used, namely an epoxidized polybutadiene (BR) ("Epolead" PB3600 from the company Daicel Chemical Industries: degree of epoxidation equal to around 28% (mol %)) and an epoxidized SBR (degree of epoxidation equal to around 15% (mol %); Tg equal to −35° C.; 27% styrene, 42% 1,4-bonds and 16% 1,2-bonds).

Trial 2

Adhesion Tests

The quality of the bond between the rubber and the composite reinforcers manufactured above was then assessed by a test in which the force needed to extract the reinforcers from a vulcanized rubber composition, also called a vulcanizate, was measured. This rubber composition was a conventional composition used for the calendering of metal tire belt plies, based on natural rubber, carbon black and standard additives.

The vulcanizate was a rubber block consisting of two sheaths measuring 200 mm by 4.5 mm and with a thickness of 3.5 mm, applied against each other before curing (the thickness of the resulting block was then 7 mm). It was during the conduction of this block that the composite reinforcers (15 strands in total) were imprisoned between the two rubber sheets in the uncured state, an equal distance apart and with one end of each composite reinforcer projecting on either side of these sheets an amount sufficient for the subsequent tensile test. The block containing the reinforcers was then placed in a suitable mould and then cured under pressure. The curing temperature and the curing time, left to the discretion of a person skilled in the art, were adapted to the intended test conditions. For example, in the present case, the block was cured at 160° C. for 15 minutes under a pressure of 16 bar.

After being cured, the specimen, thus consisting of the vulcanized block and the 15 reinforcers, was placed between the jaws of a suitable tensile testing machine so as to pull each reinforcer individually out of the rubber, at a given pull rate and a given temperature (for example, in the present case, at 50 mm/min and 20° C. respectively). The adhesion levels were characterized by measuring the pull-out force (denoted by $F_{max}$) for pulling the reinforcers out of the specimen (this being an average over 15 tensile tests).

It was found, that the composite reinforcers of the invention, despite the fact that they contain no RFL adhesive (nor any other adhesive), had a particularly high and unexpected pull-out force $F_{max}$, always greater than the control pull-out force measured on the nylon-sheathed control composite reinforcer (R-5) and bonded using a conventional RFL adhesive: at ambient temperature (25° C.) and for a relative base equal to 100 for the control composite reinforcer R-5, the composite reinforcers of the invention, with a second layer made of PPE and respectively epoxidized BR or SBR, had a pull-out force $F_{max}$ that was increased by 25% (epoxidized BR) and 150% (epoxidized SBR) compared to the control composite reinforcer R-5.

Under the same conditions, the control composite reinforcer (R-5) sheathed with nylon but containing no RFL adhesive (or any other adhesive), showed no adhesion to the rubber (practically zero pull-out force).

Consequently, due to its self-adhesive nature, the composite reinforcer of the invention constitutes a particularly useful alternative, on account of the very high adhesion levels obtained, to the composite reinforcers of the prior art that are sheathed with a thermoplastic material such as a polyamide or polyester which require, as is known, the use of an RFL adhesive to ensure that they adhere to the rubber.

The invention claimed is:

1. A composite reinforcer comprising:
   one or more reinforcing steel thread(s);
   a first layer of a thermoplastic polymer, the glass transition temperature of which is positive, covering said thread, individually each thread or collectively several threads; and
   a second layer of a composition comprising a poly(p-phenylene ether) ("PPE") and a functionalized diene elastomer bearing functional groups selected from the group consisting of epoxide, carboxyl, acid anhydride and acid ester groups, covering the first layer.

2. The reinforcer according to claim 1, wherein the glass transition temperature of the thermoplastic polymer is greater than +20° C.

3. The reinforcer according to claim 1, wherein the thermoplastic polymer of the first layer is an aliphatic polyamide or a polyester.

4. The reinforcer according to claim 3, wherein the thermoplastic polymer of the first layer is a polyamide 6,6.

5. The reinforcer according to claim 1, wherein the PPE has a glass transition temperature greater than 150° C.

6. The reinforcer according to claim 1, wherein the PPE is poly(2,6-dimethyl-1,4-phenylene ether).

7. The reinforcer according to claim 1, wherein the diene elastomer of the functionalized diene elastomer is selected from the group consisting of natural rubber, synthetic polyisoprenes, polybutadienes, butadiene copolymers, isoprene copolymers and mixtures of these elastomers.

8. The reinforcer according to claim 1, wherein the functionalized diene elastomer is an epoxidized diene elastomer.

9. The reinforcer according to claim 8, wherein the diene elastomer of the functionalized diene elastomer is a natural rubber or a synthetic polyisoprene.

10. The reinforcer according to claim 8, wherein the diene elastomer of the functionalized diene elastomer is a polybutadiene or a butadiene/styrene copolymer.

11. The reinforcer according to claim 1, wherein the diene elastomer of the functionalized diene elastomer is a styrene/butadiene copolymer.

12. The reinforcer according to claim 1, wherein the minimum thickness of the first layer is between 1 μm and 2 mm.

13. The reinforcer according to claim 1, wherein the minimum thickness of the second layer lies in the range from 0.02 μm to 10 μm.

14. The reinforcer according to claim 1, wherein the reinforcing steel thread is a cord.

15. The reinforcer according to claim 1, wherein the reinforcing steel thread is a carbon steel thread.

16. A rubber article or semi-finished product comprising the composite reinforcer according to claim 1.

17. A pneumatic tire comprising the composite reinforcer according to claim 1.

18. A process for manufacturing the composite reinforcer according to claim 1, comprising the following steps:
- individually the reinforcing thread or each reinforcing thread, or collectively several reinforcing threads, is/are covered by the first layer of the thermoplastic polymer having a positive glass transition temperature;
- the second layer of the composition comprising the poly (p-phenylene ether) ("PPE") and the functionalized diene elastomer bearing functional groups selected from the group consisting of epoxide, carboxyl, acid anhydride and acid ester groups, is deposited on the first layer; and
- the reinforcing thread covered by the first layer of the thermoplastic polymer, and by the second layer of the composition undergoes a thermo-oxidative treatment.

\* \* \* \* \*